United States Patent
Booton

(10) Patent No.: US 8,526,460 B2
(45) Date of Patent: Sep. 3, 2013

(54) SYSTEMS AND METHODS FOR SCHEDULING ASYNCHRONOUS TASKS TO RESIDUAL CHANNEL SPACE

(75) Inventor: Richard Booton, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 1201 days.

(21) Appl. No.: 12/243,127

(22) Filed: Oct. 1, 2008

(65) Prior Publication Data

US 2010/0083265 A1    Apr. 1, 2010

(51) Int. Cl.
*H04B 7/212* (2006.01)

(52) U.S. Cl.
USPC ........ 370/442; 718/103; 718/104; 370/359.4; 370/443; 370/458; 370/498

(58) Field of Classification Search
USPC ................ 370/345, 347, 348, 395.4–395.43, 370/442–443, 458, 498; 718/103, 104
See application file for complete search history.

(56) References Cited

U.S. PATENT DOCUMENTS

| | | | |
|---|---|---|---|
| 5,384,777 A | * | 1/1995 | Ahmadi et al. ............... 370/337 |
| 5,408,663 A | | 4/1995 | Miller |
| 5,535,207 A | | 7/1996 | Dupont et al. |
| 5,724,587 A | | 3/1998 | Carmon et al. |
| 6,338,130 B1 | | 1/2002 | Sinibaldi et al. |
| 6,385,638 B1 | | 5/2002 | Baker-Harvey |
| 6,577,641 B1 | | 6/2003 | Izumi et al. |
| 6,711,607 B1 | | 3/2004 | Goyal |
| 6,941,532 B2 | | 9/2005 | Haritsa et al. |
| 7,006,516 B2 | | 2/2006 | Bellier et al. |
| 7,082,111 B2 | | 7/2006 | Amouris |

(Continued)

FOREIGN PATENT DOCUMENTS

EP    672990 A2 *    9/1995

OTHER PUBLICATIONS

Ben-Shimol, Y.; Kitroser, I.; Dinitz, Y.;, "Two-dimensional mapping for wireless OFDMA systems," Broadcasting, IEEE Transactions on, vol. 52, No. 3, pp. 388-396, Sep. 2006 doi: 10.1109/TBC.2006. 879937 URL: http://ieeexplore.ieee.org/stamp/stamp.jsp?tp= &arnumber=1677815&isnumber=35289.*

(Continued)

*Primary Examiner* — Hassan Kizou
*Assistant Examiner* — Ashil Farahmand
(74) *Attorney, Agent, or Firm* — Fox Rothschild, LLP; Robert J. Sacco

(57) ABSTRACT

Systems (100)/methods (1000) for allocating performance of data service tasks (DST-1, . . . , DST-30) of a defined duration or data volume among time frames ($202_{1-1}$, $202_{1-2}$, . . . , $202_{1-N}$, . . . , $202_{17-1}$, $202_{17-2}$, . . . , $202_{17-N}$) defined in separate communication channels ($200_1$, . . . , $200_{17}$). Each time frame has a predetermined duration and number of time chips ($302_{1-1}$, $302_{1-2}$, . . . , $302_{1-26624}$). The methods involve allocating portions of the time frames to synchronous type data service tasks (STDSTs). STDSTs (DTS-1, . . . , DST-14, DST-16, . . . , DST-18, DST-20, . . . , DST-30) must be communicated in consecutive time chips of a single channel. The methods also involve allocating residual channel space portions of the time frames to asynchronous type data service tasks (ATDSTs). ATDSTs (DST-15, DST-19) do not require data to be communicated in consecutive time chips of a single channel.

16 Claims, 14 Drawing Sheets

(56) References Cited

U.S. PATENT DOCUMENTS

| | | |
|---|---|---|
| 7,093,250 B1 | 8/2006 | Rector |
| 7,313,234 B2 | 12/2007 | Takagaki et al. |
| 7,516,455 B2 | 4/2009 | Matheson et al. |
| 7,688,776 B2 | 3/2010 | Sexton et al. |
| 7,801,152 B2 * | 9/2010 | Lenzini et al. ............ 370/395.4 |
| 2003/0037091 A1 * | 2/2003 | Nishimura et al. ........... 709/103 |
| 2003/0074175 A1 | 4/2003 | Haritsa et al. |
| 2006/0064696 A1 * | 3/2006 | Lin et al. ...................... 718/100 |
| 2007/0169125 A1 | 7/2007 | Qin |
| 2008/0066072 A1 | 3/2008 | Yurekli et al. |
| 2008/0167062 A1 * | 7/2008 | Gilbert et al. ................ 455/516 |
| 2010/0100883 A1 | 4/2010 | Booton |

OTHER PUBLICATIONS

Time division multiple access [online], [retrieved on Jul. 11, 2008]. Retrieved from the Internet <URL: http://en.wikipedia.org/wiki/Time_division_multiple_access>.

Time Division Multiple Access (TDMA), International Engineering Consortium [online], [retrieved on Jul. 11, 2008]. Retrieved from the Internet <URL: http://www.iec.org/online.tutorials/tdma/>.

Information about Related Patents and Patent Applications, see section 6 of the accompanying Information Disclosure Statement Letter, which concerns Related Patents and Patent Applications.

* cited by examiner

| Data Service Task | Number of Time Chips Needed to Transmit Data | Data Service Task | Number of Time Chips Needed to Transmit Data |
|---|---|---|---|
| DST-15 | ≈ 25,050 | DST-25 | ≈ 14,000 |
| DST-22 | ≈ 22,700 | DST-23 | ≈ 11,000 |
| DST-27 | ≈ 22,500 | DST-20 | ≈ 8,000 |
| DST-19 | ≈ 21,000 | DST-1 | ≈ 7,500 |
| DST-12 | ≈ 19,500 | DST-17 | ≈ 7,000 |
| DST-11 | ≈ 18,000 | DST-29 | ≈ 7,000 |
| DST-14 | ≈ 17,500 | DST-2 | ≈ 5,500 |
| DST-26 | ≈ 17,500 | DST-6 | ≈ 4,750 |
| DST-4 | ≈ 17,000 | DST-3 | ≈ 3,000 |
| DST-21 | ≈ 17,000 | DST-5 | ≈ 2,750 |
| DST-30 | ≈ 17,000 | DST-7 | ≈ 2,500 |
| DST-9 | ≈ 15,500 | DST-13 | ≈ 2,400 |
| DST-24 | ≈ 15,400 | DST-18 | ≈ 2,000 |
| DST-10 | ≈ 14,500 | DST-28 | ≈ 1,000 |
| DST-8 | ≈ 14,200 | DST-16 | ≈ 300 |

| Data Service Task | Number of Time Chips Needed to Transmit Data | Data Service Task | Number of Time Chips Needed to Transmit Data |
|---|---|---|---|
| DST-22 | 22,700 | DST-23 | 11,000 |
| DST-27 | 22,500 | DST-20 | 8,000 |
| DST-12 | 19,500 | DST-1 | 7,500 |
| DST-11 | 18,000 | DST-17 | 7,000 |
| DST-14 | 17,500 | DST-29 | 7,000 |
| DST-26 | 17,500 | DST-2 | 5,500 |
| DST-4 | 17,000 | DST-6 | 4,750 |
| DST-21 | 17,000 | DST-3 | 3,000 |
| DST-30 | 17,000 | DST-5 | 2,750 |
| DST-9 | 15,500 | DST-7 | 2,500 |
| DST-24 | 15,400 | DST-13 | 2,400 |
| DST-10 | 14,500 | DST-18 | 2,000 |
| DST-8 | 14,200 | DST-28 | 1,000 |
| DST-25 | 14,000 | DST-16 | 300 |

900

US 8,526,460 B2

SYSTEMS AND METHODS FOR SCHEDULING ASYNCHRONOUS TASKS TO RESIDUAL CHANNEL SPACE

BACKGROUND OF THE INVENTION

1. Statement of the Technical Field

The invention concerns communication systems, data processing system, and data storage systems. More particularly, the invention concerns systems and methods for allocating asynchronous information to residual channel spaces.

2. Description of the Related Art

Multiplexing of data processing and communications tasks has become increasingly more important as the amount of data being processed and/or transmitted continues to increase. For example, in the case of satellite communications, existing satellites have only a limited amount of transmission resources that need to be multiplexed for a relatively large number of users. Similarly, data processing systems typically have a finite amount of resources that need to be multiplexed for a relatively large number of users.

Although the amount of system resources can be increased to provide additional processing or transmission capacity needed, this is often impractical or cost prohibitive. For instance, in order to increase satellite transmission capacity, the satellite hardware typically must be upgraded or replaced. This generally requires that the satellite be captured in orbit and/or returned to earth safely, followed by reconfiguration of the satellite prior to reinsertion into orbit. Alternatively, a new satellite can be inserted into orbit to provide the additional capacity. In either approach, new satellite component costs and spaceflight costs are typically high. Similarly, in the case of data processing resources, the additional costs to provide increased processing power (hardware, software, operation, and maintenance costs) are generally high. As a result of such costs, conventional systems typically utilize scheduling techniques to multiplex the user tasks using the limited resources available.

Conventional scheduling techniques generally enable scheduling of multiple user tasks. For example, in the case of satellite communications, only a limited number of communications channels are generally available. To allow multiple users to access these channels, the signals exchanged between the satellite and a receiving station make use of time division multiple access (TDMA) methods. That is, for each satellite transmission channel, the use of the channel is multiplexed over periods of time (frames) to allow multiple users access to the same channel by evaluating the current time slot arrangement of the satellite channels and allocating to a user the first available timeslot(s) in a channel. Similarly, processing capacity is typically allocated to user tasks by determining the first available processing time slot in the channels.

SUMMARY OF THE INVENTION

The present invention concerns methods for allocating performance of a set of data service tasks of defined duration or data volume among time frames respectively defined in separate communication channels. Each time frame is of a predetermined duration. Each time frame is subdivided into a predetermined number of time chips. The methods involve ordering synchronous type data service tasks in accordance with a size or data volume of each synchronous type data service task. The methods also involve allocating portions of the time frames to the synchronous type data service tasks. The synchronous type data service tasks must be communicated in consecutive time chips of a single channel. The methods further involve allocating residual channel space portions of the time frames to asynchronous type data service tasks. The asynchronous type data service tasks do not require data to be communicated in consecutive time chips of a single communication channel.

According to an aspect of the invention, time frames are allocated to the synchronous type data service tasks in accordance with a first to fit type allocation method or a best fit type allocation method. The first to fit type allocation method involves assigning the synchronous type data services tasks to time frames without regard to the duration or data volume, except when the duration or data volume exceeds a remaining capacity in a time frame. The best fit allocation method involves assigning the synchronous type data services tasks to time frames in accordance with an ordering based on the data volume or duration of each synchronous type data service task.

According to another aspect of the invention, the methods involve determining one or more combinations of the residual channel space portions which are of sufficient duration for being allocated to a first asynchronous type data service tasks. Thereafter, the first asynchronous type data service task is allocated to the combination of residual channel space portions which has the least collective channel capacity capable of servicing the first asynchronous type data service task. The methods also involve determining if the combination of residual channel space portions contains overlapping time chips in different time frames. If the combination of residual channel space portions contains overlapping time chips in different time frames, then at least one residual channel space portion of the combination is relocated within at least one of the time frames.

The present invention also concerns systems implementing the above described methods. In this regard, it should be understood that the systems generally comprise at least one processing element (e.g., a base station or user terminal) configured for ordering the synchronous type data service tasks in accordance with the defined duration or data volume of each synchronous type data service task. The processing element is also configured for allocating portions of the time frames to the synchronous type data service tasks in accordance with the first to fit type allocation method or a best fit type allocation method. The processing element is further configured for allocating the residual channel space portions of the time frames to the asynchronous type data service tasks.

BRIEF DESCRIPTION OF THE DRAWINGS

Embodiments will be described with reference to the following drawing figures, in which like numerals represent like items throughout the figures, and in which:

FIG. 7 is a table illustrating an exemplary ordering of data service tasks that is useful for understanding the present invention.

FIG. 9 is a table illustrating an exemplary ordering of synchronous data service tasks that is useful for understanding the present invention.

DETAILED DESCRIPTION OF THE PREFERRED EMBODIMENTS

The present invention can be utilized in a variety of different applications where data needs to be communicated between communication devices. Such applications include, but are not limited to, radio applications, mobile/cellular telephone applications, satellite communication applications, and other communication applications. The present invention can also be used in data storage applications and data processing applications.

Figure 1:
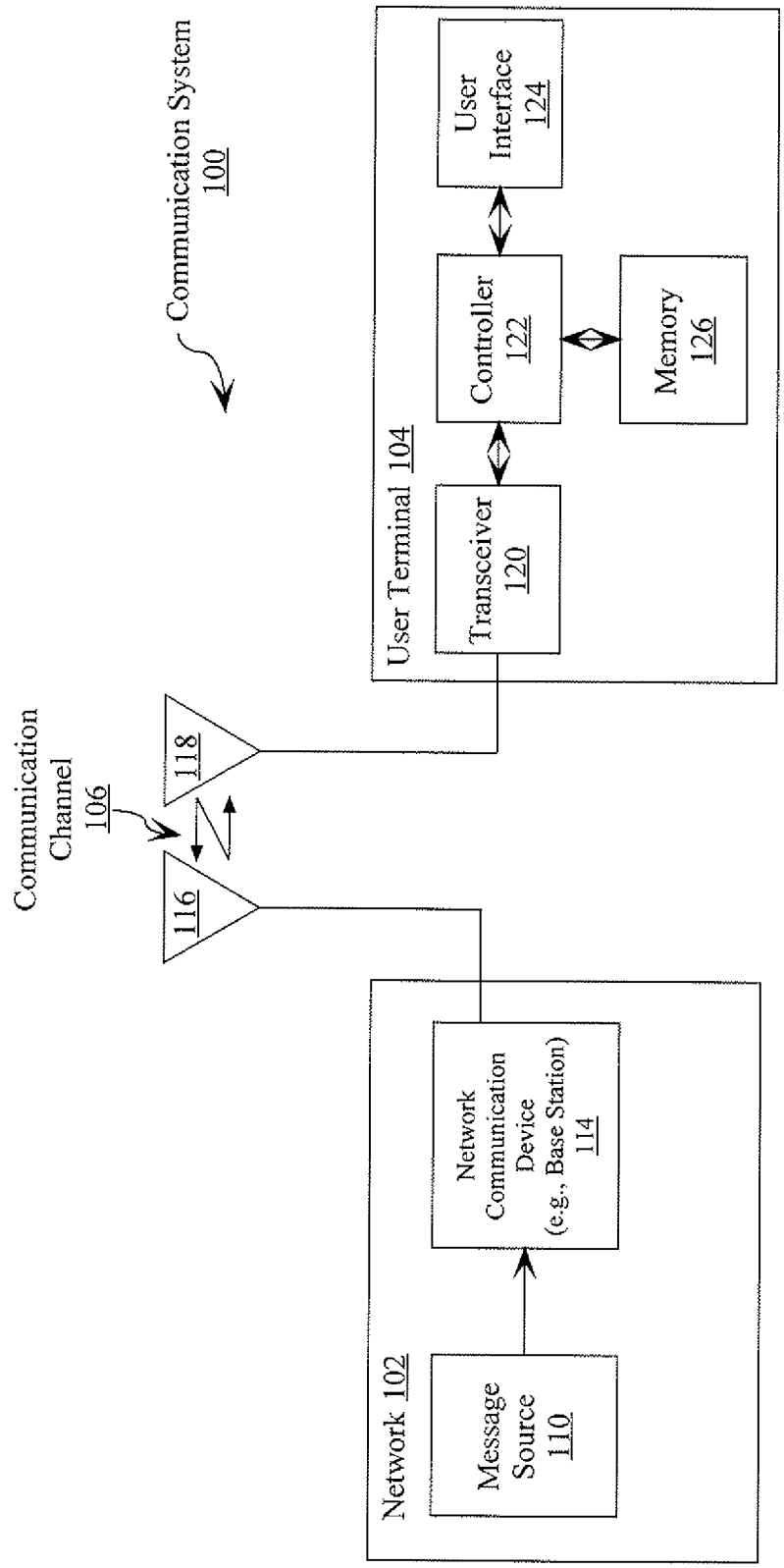
FIG. 1 is a block diagram of an exemplary communication system that is useful for understanding the present invention.

Referring now to FIG. 1, there is provided a block diagram of an exemplary TDMA based communication system 100 that is useful for understanding the present invention. As shown in FIG. 1, the communication system 100 is comprised of a network 102 and a user terminal 104. The network 102 uses a communication channel 106 to communicate with the user terminal 104. The network 102 is comprised of a message source 110 and a network communication device (NCD) 114. Although a single user terminal 104 and NCD 114 are shown in FIG. 1, the invention is not limited in this regard. The communication system 100 can include any number of user terminals and NCDs selected in accordance with a particular communication application.

Referring again to FIG. 1, the network 102 uses a communication channel 106 to communicate with the user terminal 104. The network 102 is comprised of a message source 110 and an NCD 114. Generally, various data messages (including those intended for or originating with the user terminal 104) are exchanged between the message source 100 and NCD 114. The NCD 114 can be a user terminal or a base station. Base stations are well known to those having ordinary skill in the art, and therefore will not be described herein. The NCD 114 includes an antenna element 116. The antenna element 116 couples the NCD 114 to the communication channel 106 for purposes of transmitting or receiving data messages and control information to or from the user terminal 104.

The user terminal 104 is typically a radio, a mobile/cellular telephone, a desktop personal computer system, a laptop personal computer system, a personal digital assistant, a wireless computing device, or any other general purpose communication/computer processing device. As such, the user terminal 104 can be coupled to the communication channel 106 by an antenna element 118. The user terminal 104 is comprised of a transceiver 120, a controller 122, a user interface 124, and a memory 126. The transceiver 120 is coupled to the antenna element 118 and controller 122. The transceiver 120 is generally configured for modulating or demodulating binary data of a data stream onto or from a carrier signal (e.g., a radio signal for a wireless communication channel). The data stream can be supplied to the transceiver 120 by the controller 122 for modulation purposes. Alternatively, the data stream can be supplied to the controller 122 by the transceiver 120 for demodulation and/or further processing. The controller 122 can process the data stream to recover payload data and control information therefrom. The payload data can be stored in the memory 126. The controller 122 is coupled to the user interface 124. The user interface 124 can be a display device used to display data or messages to a user (not shown).

The communication channel 106 can be organized so as to support a multiplex capability. For example, if the communication channel 106 is a wireless communication channel, then a plurality of separate frequency bands can be used for communicating signals between the network 102 and user terminal 104. Each of the frequency bands is referred to herein as a channel. Each of the channels can be divided into a predetermined number of time frames of time chips for various reasons. Such reasons can include, but are not limited to, the facilitation of user terminal battery or power conservation. Under these circumstances, the user terminal 104 is configured to receive signals transmitted during certain time slots of the frequency bands, wherein each time slot comprises a plurality of time chips.

Figures 2, 3:
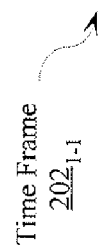
FIG. 2 is a schematic illustration of a plurality of channels used by the communication system of FIG. 1 for transmitting signals between the network and user terminal.
FIG. 3 is a schematic illustration of a time frame that is useful for understanding the present invention.

Referring now to FIG. 2, there is provided a schematic illustration of a plurality of channels $200_1, \ldots, 200_{17}$ used by the communication system 100 for transmitting signals between the network 102 and user terminal 104. Although seventeen (17) channels are shown in FIG. 2, the invention is not limited in this regard. The communication system 100 can use any number of channels selected in accordance with a particular time division multiple access (TDMA) application. As shown in FIG. 2, each of the channels $200_1, \ldots, 200_{17}$ is comprised of "N" time frames $202_{1-1}, 202_{1-2}, \ldots, 202_{1-N}, \ldots, 202_{17-1}, 202_{17-2}, \ldots, 202_{17-N}$, respectively. For example, a first channel $200_1$ comprises time frames $202_{1-1}, \ldots, 202_{1-N}$. Similarly, a seventeenth channel $200_{17}$ comprises time frames $202_{17-1}, \ldots, 202_{17-N}$. Each time frame $202_{1-1}, 202_{1-2}, \ldots, 202_{1-N}, \ldots, 202_{17-1}, 202_{17-2}, \ldots, 202_{17-N}$ comprises a predefined duration of time. Moreover, time frames in each channel are generally chronologically assigned. For example, time frames $202_{1-1}, 202_{2-1}, \ldots, 202_{17-1}$ all begin and end at the same time. Likewise, time frames $202_{1-2}, 202_{2-2}, \ldots, 202_{17-2}$ all begin and end at the same time.

Referring now to FIG. 3, a schematic illustration of time frame $202_{1-1}$ is provided that is useful for understanding the present invention. It should be understood that the remaining time frames in FIG. 2 are the same as or substantially similar to the time frame $202_{1-1}$. As shown in FIG. 3, time frame $202_{1-1}$ is comprised of a plurality of time chips $302_{1-1}, 302_{1-2}, \ldots, 302_{1-26624}$. Each time chip $302_{1-1}, 302_{1-2}, \ldots, 302_{1-26624}$ represents some duration of time that is a fractional part of a corresponding time frame. Although, the time frame $202_{1-1}$ is shown to comprise twenty-six thousand six hundred twenty-four (26,624) time chips, the invention is not limited in this regard. Time frame $202_{1-1}$ can comprise any number of time chips selected in accordance with a particular communication system application.

Figure 4:
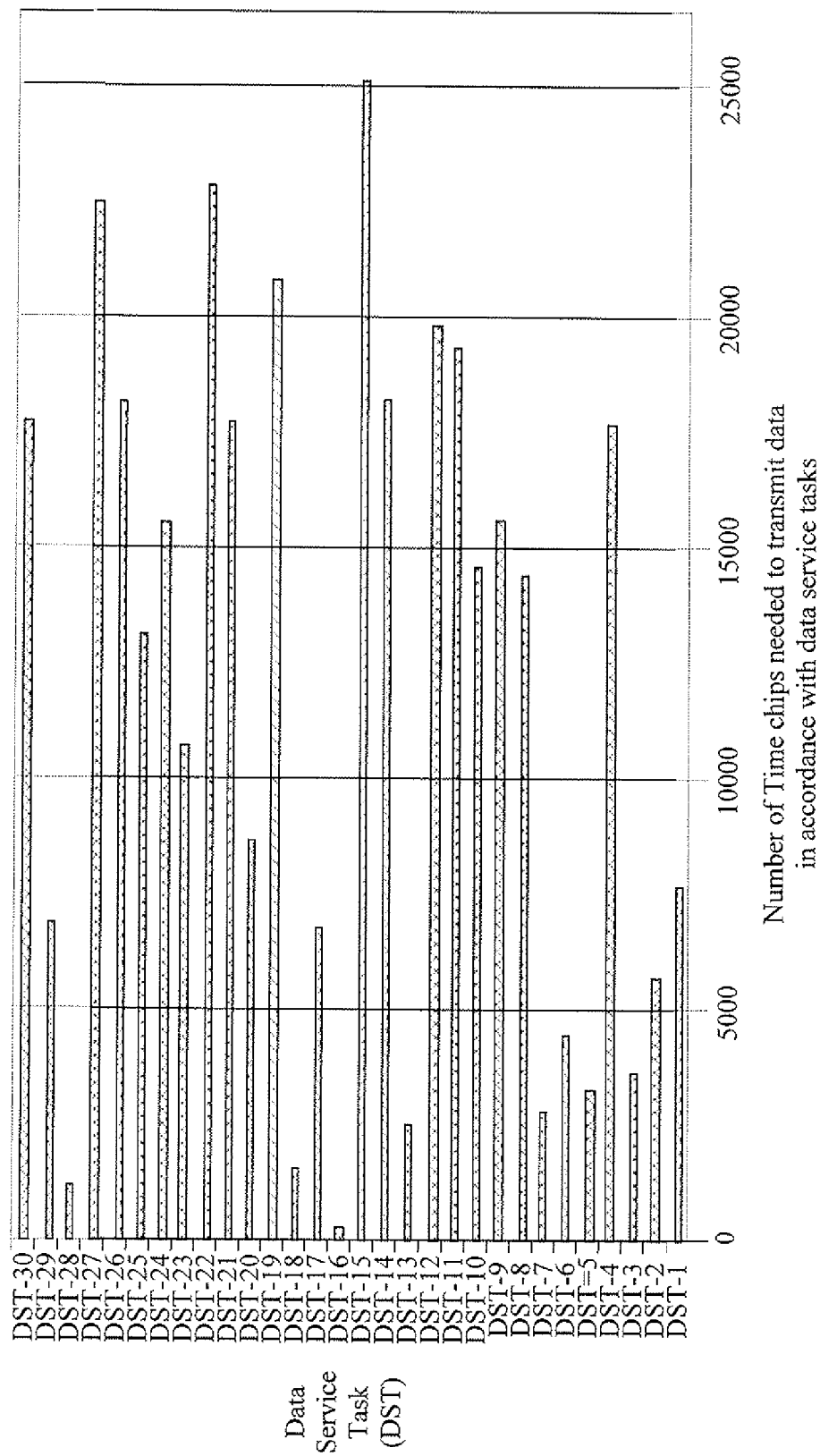
FIG. 4 is a schematic illustration of a plurality of exemplary data service tasks that are to be performed by the communication system of FIG. 1.

Referring now to FIG. 4, there is provided a schematic illustration of a plurality of data service tasks DST-1, ..., DST-30 that are to be performed by at least one network communication device 114 (described above in relation to FIG. 1) and/or user terminal 104 (described above in relation to FIG. 1) of the communication system 100 (described above in relation to FIG. 1). Although thirty (30) data service tasks are shown in FIG. 4, the invention is not limited in this regard. Any number of data service tasks can be performed by the network communication device 114 (described above in relation to FIG. 1) and/or user terminal 104 (described above in relation to FIG. 1) of the communication system 100.

As shown in FIG. 4, each data service task DST-1, ..., DST-30 is defined by a duration or data volume. Each of the data service tasks DST-1, ..., DST-30 requires a particular channel capacity for communicating data. For example, data service task DST-1 requires approximately seven thousand five hundred (7500) consecutive time chips of a single channel for communicating data. Data service task DST-2 requires approximately five thousand five hundred (5500) consecutive time chips of a single channel for communicating data, and so on. The invention is not limited in this regard.

Prior to performing the data service tasks, the performance of the data service tasks DST-1, ..., DST-30 are allocated among a plurality of time frames (e.g., time frames $202_{1-1}$, $202_{2-1}$, $202_{3-1}$, ..., $202_{17-1}$) respectively defined in a plurality of separate channels (e.g., channels $200_1$, ..., $200_{17}$). It should be noted that the data service tasks DST-1, ..., DST-14, DST-16, ..., DST-18, DST-20, ..., DST-30 are synchronous type data service tasks. Each synchronous type data service task requires data to be communicated during a set of consecutive time chips of a single channel $200_1$, ..., $200_{17}$. Each of the sets of consecutive time chips defines a "synchronous time slot" of the respective channel. In contrast, the data service tasks DST-15, DST-19 are asynchronous type data service tasks. Each asynchronous type data service task does not require data to be communicated during consecutive time chips of a single channel $200_1$, ..., $200_{17}$. Rather, data for each asynchronous type data service task can be communicated using time chips of one or more channels. The time chips of each channel define an "asynchronous time slot" of the respective channel. If an asynchronous type data service task DST-15, DST-19 is allocated to two or more time frames, then the asynchronous time slots for that data service task DST-15, DST-19 can't include overlapping time chips. For example, a first asynchronous time slot for a data service task DST-15 includes time chips 1-54 of channel $200_1$. As such, other asynchronous time slots for data service task DST-15 must not include time chips 1-54 of channels $200_2$, ..., $200_{17}$. The invention is not limited in this regard.

Figure 5:
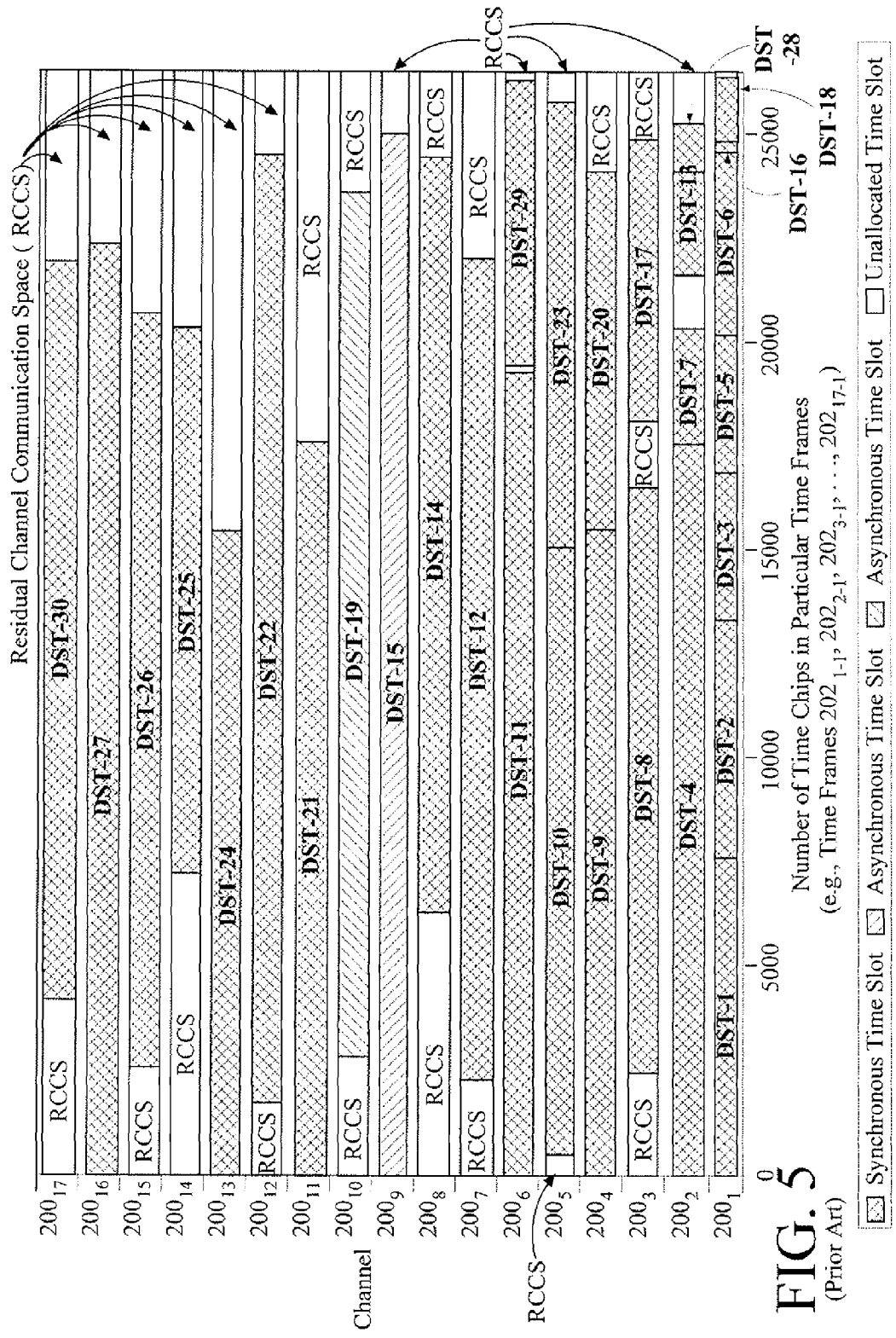
FIG. 5 is a schematic illustration of a conventional first fit arrangement that is useful for understanding the present invention.

Referring now to FIG. 5, there is provided a schematic illustration of a conventional first fit arrangement 500 that is useful for understanding the present invention. In the first fit arrangement 500, portions of particular time frames (e.g., time frames $202_{1-1}$, $202_{2-1}$, $202_{3-1}$, ..., $202_{17-1}$) are allocated to data service tasks DST-1, ..., DST-30. The first fit arrangement 500 is formed using a First-To-Fit (F-T-F) type allocation method. The F-T-F type allocation method will be described in detail below in relation to FIG. 11. However, it should be understood that the F-T-F type allocation method generally involves assigning each data service task to a time frame without regard to the predefined duration and data volume of the data service tasks, except when the duration or data volume exceeds a remaining capacity in the time frame.

The data service tasks are assigned to time frames in a sequential manner based on the order in which a request to perform the data service tasks DST-1, ..., DST-30 are received at a processing element (e.g., processing elements 114, 122) of a network 102 or user terminal 104. For example, if requests for performing data service tasks DST-1, ..., DST-30 is an order defined by their numerical portions of the designations DST-1, ..., DST-30, then the data service task DST-1 is assigned to a time frame prior to data service tasks DST-2, ..., DST-30. Next, the data service task DST-2 is assigned to a time frame. Thereafter, the data service task DST-3 is assigned to a time frame, and so on.

A description of the how the first fit arrangement 500 is formed using the F-T-F type allocation method will now be provided. As shown in FIG. 5, a first portion (e.g., 7,500 time chips) of a first time frame (e.g., time frame $202_{1-1}$) associated with the first channel $200_1$ is allocated to synchronous type data service task DST-1 without regard to the predefined duration and data volume of the data service tasks DST-1. Thereafter, a second portion (e.g., 5,500 time chips) of the first time frame (e.g., time frame $202_{1-1}$) associated with the first channel $200_1$ is allocated to synchronous type data service task DST-2 without regard to the predefined duration and data volume of the data service tasks DST-2. Subsequently, a third portion (e.g., 3,000 time chips) of the first time frame (e.g., time frame $202_{1-1}$) associated with the first channel $200_1$ is allocated to synchronous type data service task DST-3 without regard to the predefined duration and data volume of the data service tasks DST-3.

After the third portion of the first time frame is allocated to data service task DST-3, a first portion of (e.g., 17,000 time chips) of a first time frame (e.g., time frame $202_{2-1}$) associated with the second channel $200_2$ is allocated to synchronous type data service task DST-4 with regard to the predefined duration and/or data volume of the data service tasks DST-4. In this regard, it should be understood that the duration or data volume of the synchronous type data service task DST-4 exceeds the remaining capacity in the first time frame (e.g., time frame $202_{1-1}$) associated with the first channel $200_1$. As such, a portion of the first time frame (e.g., time frame $202_{1-1}$) associated with the first channel $200_1$ can't be allocated to data service task DST-4.

Next, a fourth portion (e.g., 2,750 time chips) of the first time frame (e.g., time frame $202_{1-1}$) associated with the first channel $200_1$ is allocated to synchronous type data service task DST-5 without regard to the predefined duration and data volume of the data service tasks DST-5. The remaining portions of the first time frames (e.g., time frames $202_{1-1}$, $202_{2-1}$, $202_{3-1}$, ..., $202_{17-1}$) associated with the channels $200_1$, ..., $200_{17}$ are allocated to respective data service tasks DST-6, ..., DST-30 in a manner similar to that described above in relation to the time frame allocations for data service tasks DST-1, ..., DST-5.

It should be understood that the conventional first fit arrangements (e.g., the first fit arrangement 500) typically have a relatively large number of unassigned time chips. The unassigned time chips are collectively referred to herein as residual communication channel space (RCCS) of channels $200_1$, ..., $200_{17}$. One can appreciate that it is desirable to reduce the amount of RCCS of conventional first fit arrangements (e.g., the first fit arrangement 500). As such, there is a need for an improved allocation method to form arrangements with a reduced amount of RCCS. Such arrangements (formed using improved allocation methods) will be described below in relation to FIGS. 6-9.

Figure 6:
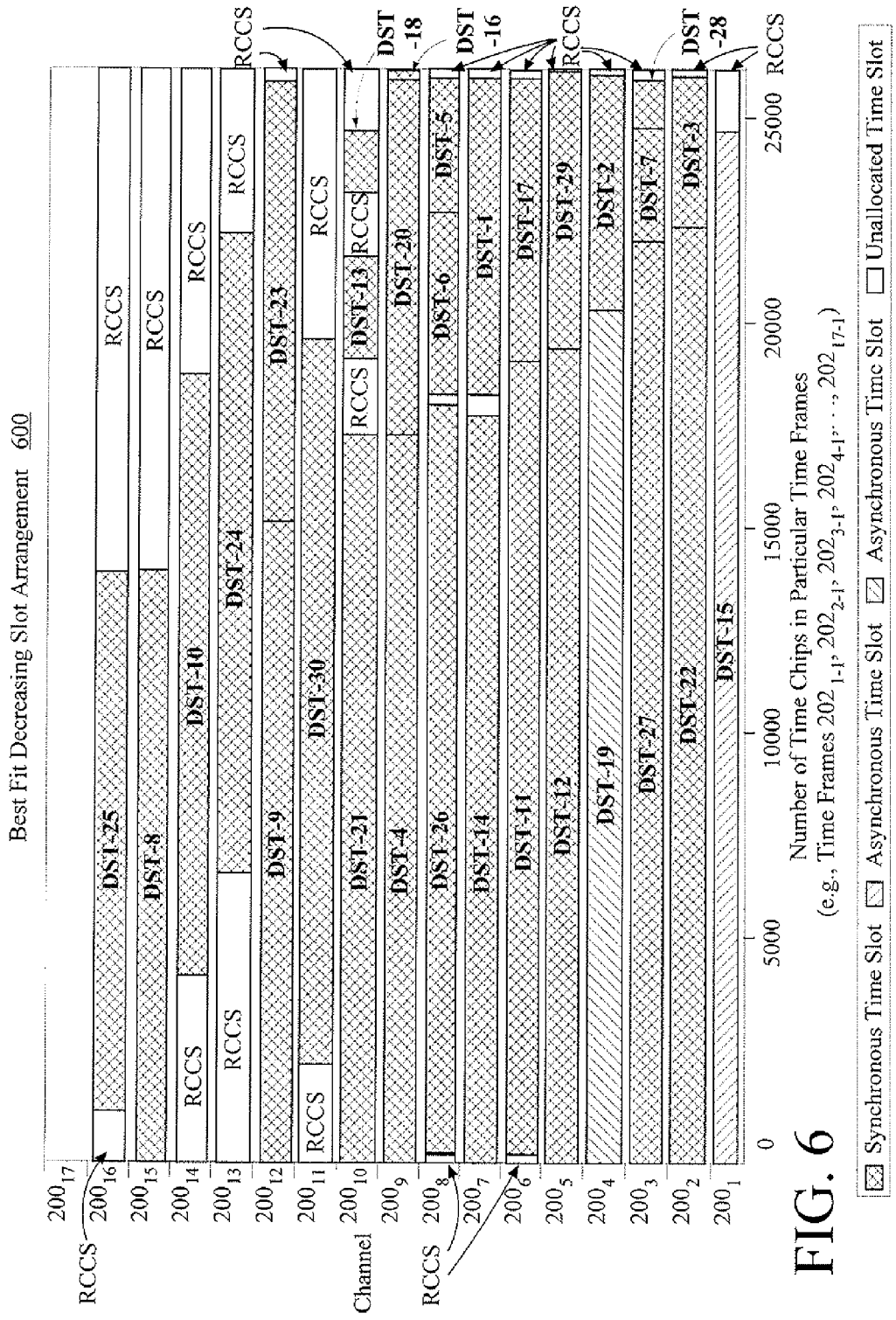
FIG. 6 is a schematic illustration of a best fit decreasing slot arrangement that is useful for understanding the present invention.

Referring now to FIG. 6, there is provided a best fit decreasing slot (BFDS) arrangement 600 that is useful for understanding the present invention. In the BFDS arrangement 600, portions of particular time frames (e.g., time frames $202_{1-1}$, $202_{2-1}, 202_{3-1}, \ldots, 202_{17-1}$) are allocated to data service tasks DST-1, ..., DST-30. The BFDS arrangement 600 is formed using a Best-Fit (B-F) type allocation method. An exemplary B-F type allocation method will be described in detail below in relation to FIG. 12. However, it should be understood that the B-F type allocation method generally involves assigning each data service task to one or more time frames in accordance with an ordering based on the defined duration and/or data volume of the data service task. An exemplary ordering of the data service tasks DST-1, ..., DST-30 is shown in table 700 of FIG. 7. A shown in table 700, the data service tasks DST-1, ..., DST-30 are organized in a decreasing order defined by the number of time chips required to transmit data in accordance with the data service tasks.

A description of the how the BFDS arrangement 600 is formed using the B-F type allocation method will now be provided. It should be understood that the exemplary ordering of the data service tasks shown in FIG. 7 is used for forming the BFDS arrangement 600. As shown in FIG. 6, a first portion (e.g., 25,050 time chips) of a first time frame (e.g., time frame $202_{1-1}$) associated with the first channel $200_1$ is allocated to asynchronous type data service task DST-15. Thereafter, a first portion (e.g., 22,700 time chips) of a first time frame (e.g., time frame $202_{2-1}$) associated with the second channel $200_2$ is allocated to synchronous type data service task DST-22. In this regard, it should be understood that the duration or data volume of the synchronous type data service task DST-22 exceeds the remaining capacity in the first time frame (e.g., time frame $202_{1-1}$) associated with the first channel $200_1$. As such, a portion of the first time frame (e.g., time frame $202_{1-1}$) associated with the first channel $200_1$ can't be allocated to data service task DST-22. Subsequently, a first portion (e.g., 22,500 time chips) of a first time frame (e.g., time frame $202_{3-1}$) associated with the third channel $200_3$ is allocated to synchronous type data service task DST-27. In this regard, it should be understood that the duration or data volume of the synchronous type data service task DST-27 exceeds the remaining capacity in the first time frames (e.g., time frames $202_{1-1}$, $202_{2-1}$) associated with channels $200_1$, $200_2$. As such, portions of the first time frames (e.g., time frames $202_{1-1}$, $202_{2-1}$) associated with channels $200_1$, $200_2$ can't be allocated to the synchronous type data service task DST-27.

Portions of the first time frames (e.g., time frames $202_{4-1}, \ldots, 202_{17-1}$) associated with channels $200_4, \ldots, 200_{17}$ are allocated to respective data service tasks DST-27, DST-19, DST-12, DST-11, DST-14, DST-26, DST-4, DST-21, DST-30, DST-9, DST-24, DST-10, DST-8, DST-25 in a manner similar to that described above in relation to the time frame allocations for data service tasks DST-15 and DST-22. Upon allocating portions of a time frame to data service task DST-25, a portion (e.g., 11,000 time chips) of a first time frame (e.g., time frame $202_{12-1}$) associated with the twelfth channel $200_{12}$ is allocated to synchronous type data service task DST-23. In this regard, it should be understood that the duration or data volume of the synchronous type data service task DST-23 exceeds the remaining capacity in the first time frames associated with channels $200_1, 200_2, \ldots, 200_{11}$. As such, portions of the first time frames associated with channels $200_1, 200_2, \ldots, 200_{11}$ can't be allocated to data service task DST-23. The above described process is repeated for DST-20, DST-1, DST-17, DST-29, DST-2, DST-6, DST-3, DST-5, DST-7, DST-13, DST-18, DST-28, and DST-16.

It should be understood that the above described BFDS arrangement 600 utilizes one less channel than the first fit arrangement 500. The BFDS arrangement 600 also has a smaller RCCS as compared to the first fit arrangement 500. Despite the reduction of the RCCS, there is still a need for a further improved allocation method in which an arrangement is formed having a further reduced RCCS. Such an arrangement will be described below in relation to FIGS. 8A-9.

Figure 8A:
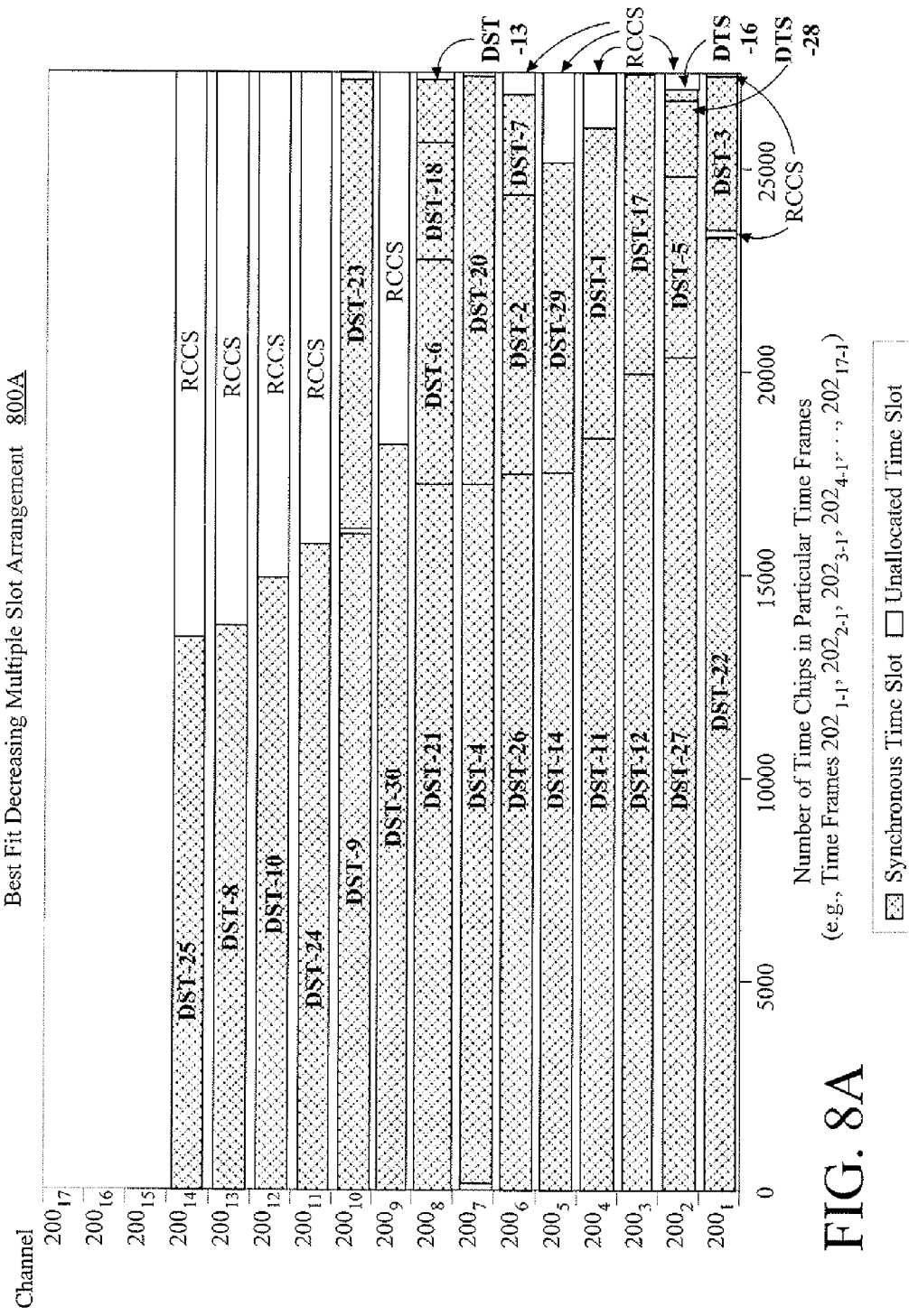
FIG. 8A is a schematic illustration of a best fit decreasing multiple slot arrangement that is useful for understanding the present invention.
Figure 8B:
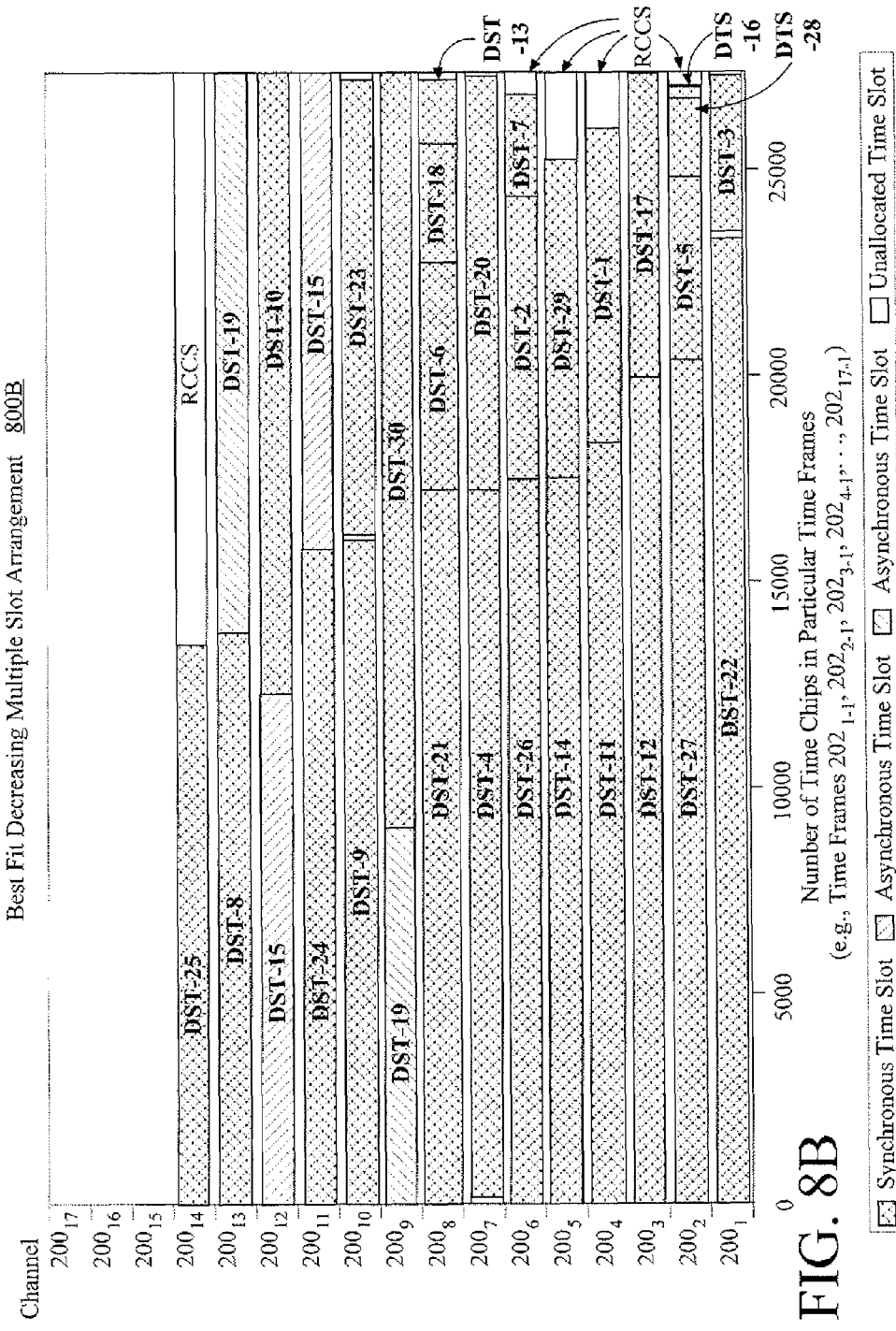
FIG. 8B is a schematic illustration of a best fit decreasing multiple slot arrangement that is useful for understanding the present invention.

Referring now to FIGS. 8A-8B, there are provided schematic illustrations of best fit decreasing multiple slot (BFDMS) arrangements 800A, 800B that are useful for understanding the present invention. In the BFDMS arrangement 800A, portions of particular time frames (e.g., time frames $202_{1-1}, \ldots, 202_{17-1}$) of channels $200_1, \ldots, 200_{14}$ are allocated to the synchronous type data service tasks DST-1, ..., DST-14, DST-16, ..., DST-18, DST-20, ..., DST-30. In BFDMS arrangement 800B, residual communication channel space of the BFDMS arrangement 800A is allocated to asynchronous type data service tasks DST-15, DST-19. As noted above, data for each of the synchronous type data service tasks DST-1, ..., DST-14, DST-16, ..., DST-18, DST-20, ..., DST-30 must be communicated in consecutive time chips of a single channel. In contrast, data for each of the asynchronous type data service tasks DST-15, DST-19 can be communicated in time chips of one or more channels.

It should be understood that the BFDMS arrangements 800A, 800B are formed using a Best Fit Decreasing Multiple Slot (BFDMS) type allocation method. The BFDMS type allocation method generally involves identifying synchronous type data service tasks DST-1, ..., DST-14, DST-16, ..., DST-18, DST-20, ..., DST-30 that require data to be communicated during consecutive time chips of a single channel. Thereafter, portions of particular time frames (e.g., time frames $202_{1-1}, 202_{2-1}, \ldots, 202_{17-1}$) of channels $200_1, \ldots, 200_{14}$ are allocated to the synchronous tasks DST-1, ..., DST-14, DST-16, ..., DST-18, DST-20, ..., DST-30 in accordance with the F-T-F type allocation method (described above in relation to FIG. 5) or B-F type allocation method (described above in relation to FIGS. 6-7).

If the B-F type allocation method is employed, then each synchronous data service task DST-1, ..., DST-14, DST-16, ..., DST-18, DST-20, ..., DST-30 is assigned to one or more time frames in accordance with an ordering based on the defined duration and/or data volume of the data service task. An exemplary ordering of the synchronous data service tasks DST-1, ..., DST-14, DST-16, ..., DST-18, DST-20, ..., DST-30 is shown in table 900 of FIG. 9. A shown in table 900, the synchronous data service tasks DST-1, ..., DST-14, DST-16, ..., DST-18, DST-20, ..., DST-30 are organized in a decreasing order defined by the number of time chips required to transmit data in accordance with the data service tasks. It should be understood that the BFDMS arrangement 800A is formed using the B-F type allocation method utilizing the synchronous data service task organization shown in table 900 of FIG. 9.

Subsequent to allocating portions of time frames to the synchronous type data service tasks, RCCS of channels $200_1, \ldots, 200_{14}$ is allocated to the asynchronous type data service tasks DST-15, DST-19. The RCCS of channels $200_1, \ldots, 200_{14}$ is allocated to the asynchronous type data service tasks DST-15, DST-19 using a Residual Space Minimization (RSM) type allocation method. The RSM type allocation method will be described in detail below in relation to FIGS. 13A-13B. However, it should be understood that the RSM type allocation method generally involves determining one or more combinations of residual communication space portions which are of sufficient durations for being allocated to an asynchronous type data service task (e.g., data service task DST-15 or DST-19). The RSM type allocation method also involves allocating the asynchronous type data service task (e.g., data service task DST-15 or DST-19) to the combination of residual communication space portions that has the least collective channel capacity capable of servicing the asynchronous type data service task. A schematic illustration of combinations of residual communication space portions allocated to asynchronous type data service tasks DST-15, DST-19 is provided in FIG. 8B. As shown in FIG. 8B, residual communication space portions of channels $200_{11}$, $200_{12}$ are allocated to the asynchronous type data service task DST-15. Residual communication space portions of channels $200_9$, $200_{13}$ are allocated to the asynchronous type data service task DST-19.

It should be noted that the residual communication space portion of channel $200_9$ has been relocated within the respective time frame. This residual communication space portion relocation is performed for ensuring that data for the asynchronous type data service task DST-19 is allocated to different time chips of channels $200_9$, $200_{13}$. Similarly, residual communication space portion of channel $200_{12}$ has been relocated within the respective time frame. This residual communication space portion relocation is performed for ensuring that data for the asynchronous type data service task DST-15 is allocated to different time chips of channels $200_{12}$, $200_{11}$.

It should also be noted that the above described BFDMS arrangement 800B utilizes two less channels than the BFDS arrangement 600 of FIG. 6. The BFDMS arrangement 800B also includes less RCCS as compared to the BFDS arrangement 600.

Figure 10:
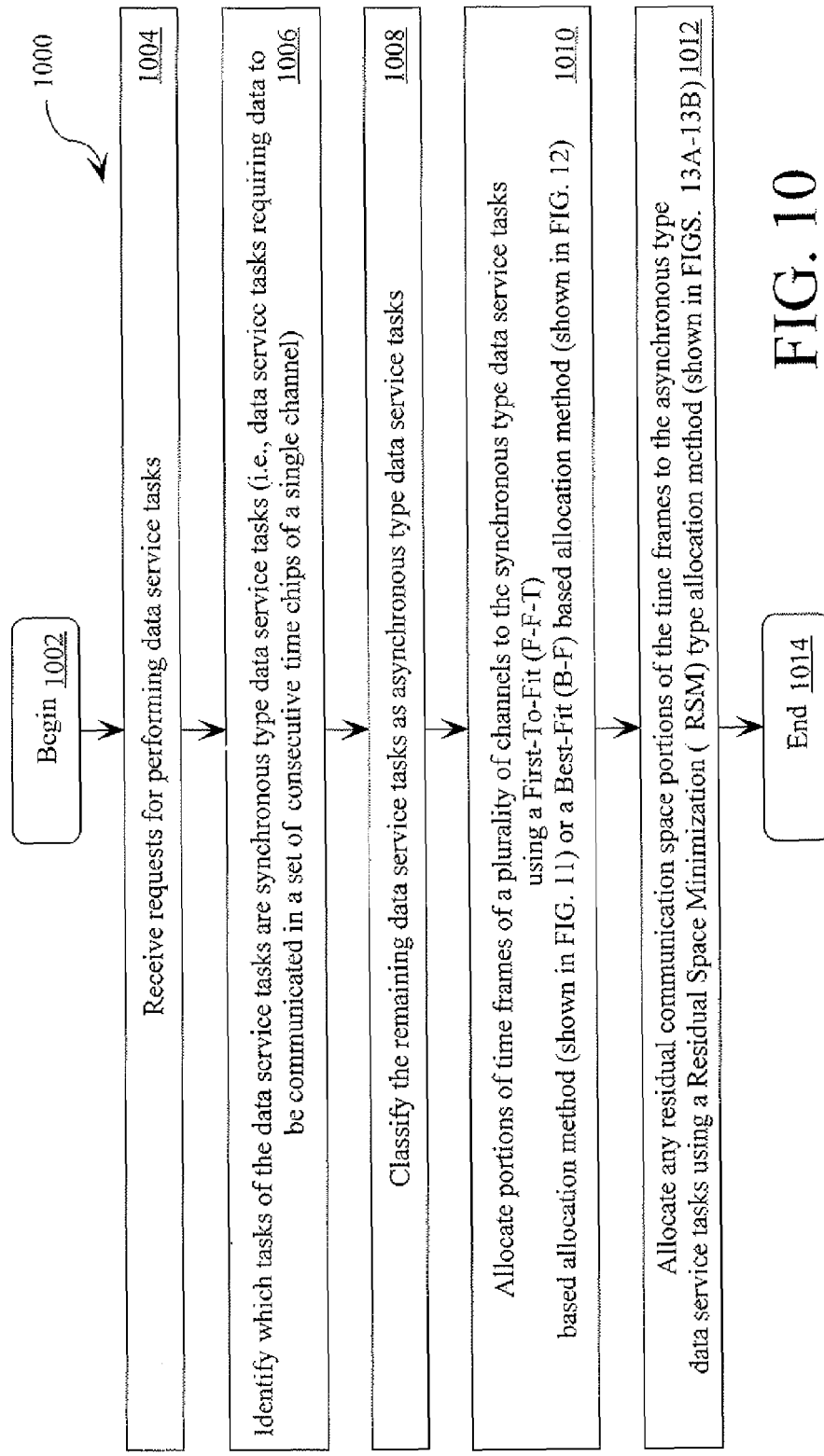
FIG. 10 is a flow diagram of a method for forming a best fit decreasing multiple slot arrangement that is useful for understanding the present invention.

Referring now to FIG. 10, there is provided a flow diagram of a BFDMS type allocation method 1000 for forming the BFDMS arrangement 800B of FIG. 8B. It should be noted that the steps of method 1000 can be performed by at least one processing element. The term "processing element", as used herein, refers to any hardware/software entity of a communication system configured to receive requests for performing a data service task and configured to perform the data service task. The hardware/software entities include, but are not limited to, base stations (e.g., network communication device 114 of FIG. 1) and user terminals (e.g., user terminal 104 of FIG. 1). As should be understood by those having ordinary skill in the art, each hardware entity can include one or more components configured to perform all or a portion of method 1000. Such components can include, but are not limited to, transceivers (e.g., transceiver 120 of FIG. 1), controllers (e.g., controller 122 of FIG. 1), microprocessors (not shown), and application specific integrated circuits (not shown).

As shown in FIG. 10, the method 1000 begins with step 1002 and continues to step 1004. In step 1004, requests for performing data service tasks are received at one or more processing elements (e.g., the network communication device 114 of FIG. 1 or the user terminal 104 of FIG. 1). The requests can be generated by a device external to the processing element (e.g., message source 110) or by a device internal to the processing element (e.g., controller 122) in response to a user action (e.g., a user action of inputting an audio or text using a user interface). After receiving the requests at the processing element(s), step 1006 is performed. In step 1006, synchronous type data service tasks are identified from the plurality of data service tasks. As noted above, synchronous type data service tasks are data service tasks that require data to be communicated in consecutive time chips of a single channel. In step 1008, the remaining data service tasks not identified as synchronous type data service type are classified as asynchronous type data service tasks.

Subsequent to completing step 1008, the method 1000 continues with step 1010. In step 1010, portions of time frames (e.g., time frames $200_{1-1}$, $200_{2-1}$, $202_{3-1}$, . . . , $200_{17-1}$) of a plurality of channels (e.g., channels $200_1$, . . . , $200_{17}$) are allocated to the synchronous type data service tasks (e.g., data service tasks DST-1, . . . , DST-14, DST-16, . . . , DST-18, DST-20, . . . , DST-30). Step 1010 can involve using the F-T-F type allocation method or the B-F type allocation method to allocate the portions of time frames (e.g., time frames $200_{1-1}$, $200_{2-1}$, $200_{3-1}$, . . . , $200_{17-1}$) to the synchronous type data service tasks. An exemplary F-T-F type allocation method will be described below in relation to FIG. 11. An exemplary B-F type allocation method will be described below in relation to FIG. 12. Upon completing step 1010, step 1012 is performed. Step 1012 involves allocating residual communication channel space portions of the time frames (e.g., time frames $200_{1-1}$, $200_{2-1}$, $200_{3-1}$, . . . , $200_{17-1}$) to the asynchronous type data service tasks using the RSM type allocation method. An exemplary RSM type allocation method will be described below in relation to FIGS. 13A-13B. Thereafter, step 1014 is performed where the method 1000 ends.

Figure 11:
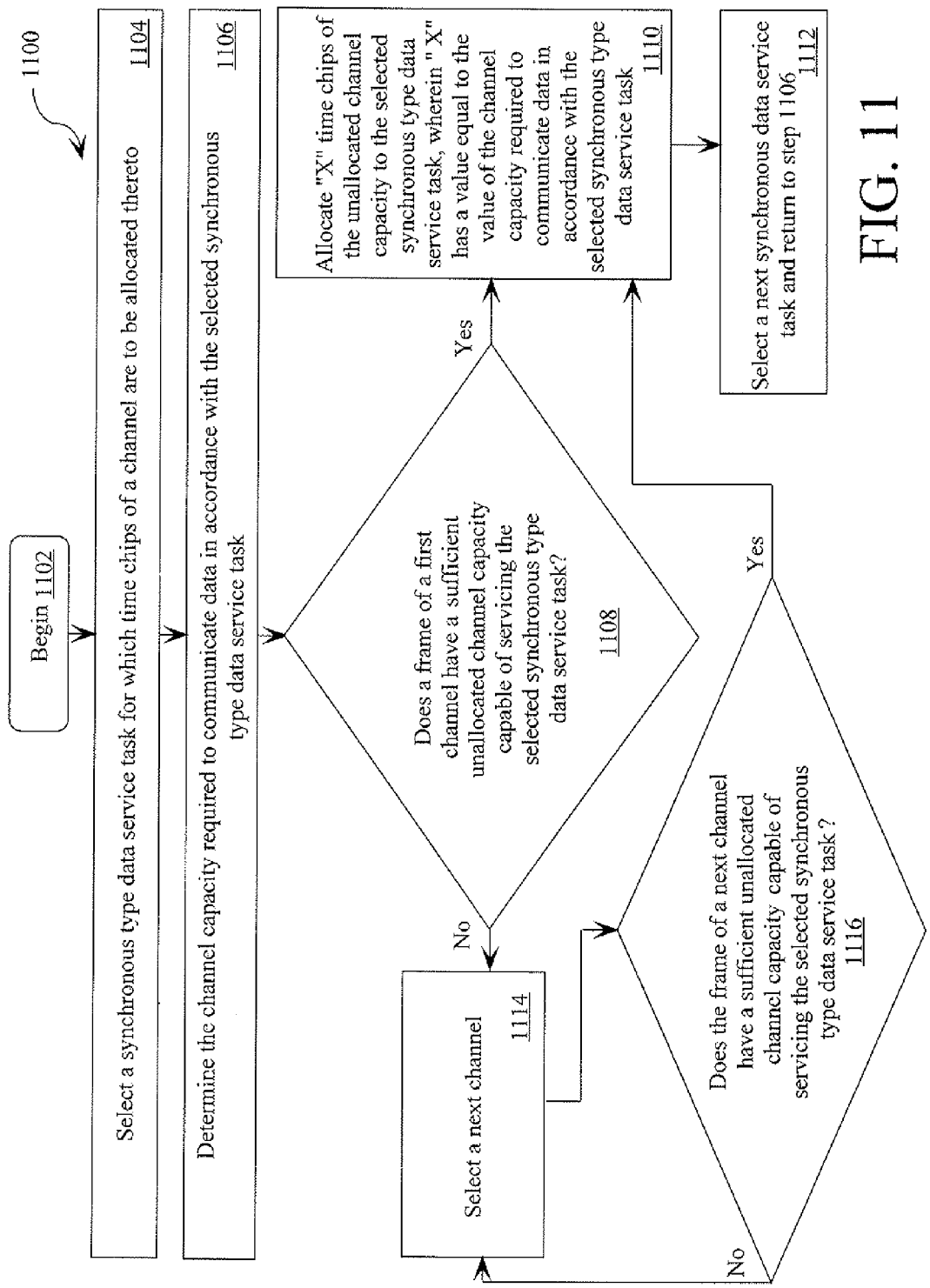
FIG. 11 is a flow diagram of a First To Fit type allocation method that is useful for understanding the present invention.

Referring now to FIG. 11, there is provided a flow diagram of an exemplary F-T-F type allocation method 1100 for allocating channel capacity to the synchronous type data service tasks that is useful for understanding the present invention. It should be noted that the method 1100 can be performed by at least one processing element. As shown in FIG. 11, the method 1100 begins with step 1102 and continues with step 1104. In step 1104, a synchronous type data service task is selected from a plurality of synchronous type data service tasks. After selecting the synchronous type data service task, the method 1100 continues with step 1106. Step 1106 involves determining the channel capacity required to communicate data in accordance with the selected synchronous type data service task. Thereafter, a decision step 1108 is performed.

If a time frame (e.g., time frame $202_{1-1}$) of the first channel (e.g., channel $200_1$) has a sufficient unallocated channel capacity capable of servicing the selected synchronous data service task [1108:YES], then step 1110 is performed. In step 1110, "X" time chips of the unallocated channel capacity are allocated to the selected synchronous type data service task. "X" has a value equal to the value of the channel capacity required to communicate data in accordance with the selected synchronous type data service task. Subsequent to allocating the "X" time chips to the selected synchronous type data service task, step 1112 is performed where a next synchronous type data service task is selected. Step 1112 also involves returning to step 1106.

If the time frame (e.g., time frame $202_{1-1}$) of the first channel (e.g., channel $200_1$) does not have a sufficient unallocated channel capacity capable of servicing the selected synchronous data service task [1108:NO], then step 1114 is performed. In step 1114, a next channel (e.g., channel $200_2$) is selected. Thereafter, a determination is made as to whether the time frame (e.g., time frame $202_{2-1}$) of the next channel (e.g., channel $200_2$) has a sufficient unallocated channel capacity capable of servicing the selected synchronous type data service task. If the time frame (e.g., time frame $202_{2-1}$) of the next channel (e.g., channel $200_2$) does not have a sufficient unallocated channel capacity capable of servicing the selected synchronous type data service task [1116:NO], then the method 1100 returns to step 1114. If the time frame (e.g., time frame $202_{2-1}$) of the next channel (e.g., channel $200_2$) has a sufficient unallocated channel capacity capable of servicing the selected synchronous type data service task [1116: YES], then the method 1100 continues with step 1110.

Figure 12:
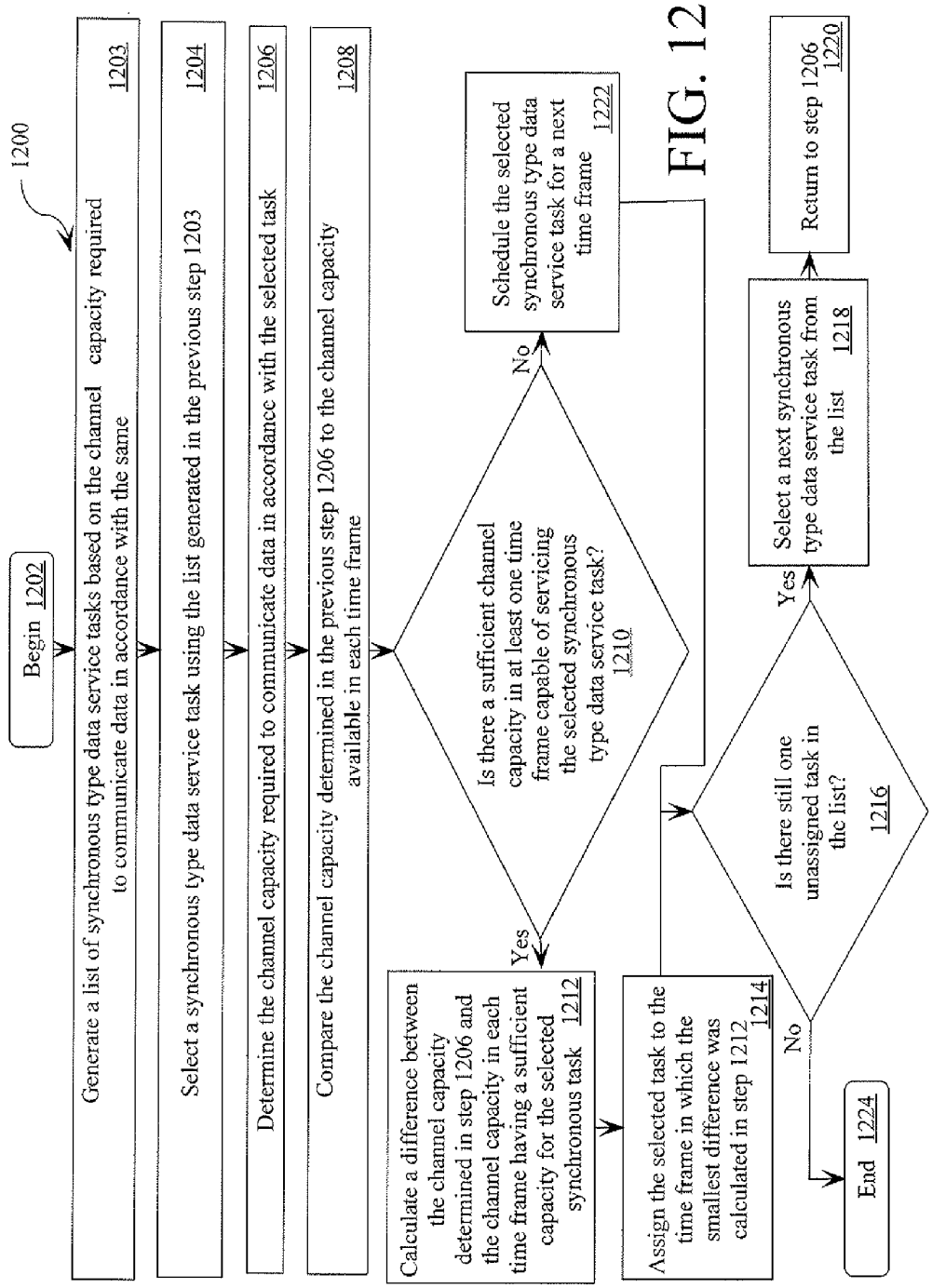
FIG. 12 is a flow diagram of a Best Fit type allocation method that is useful for understanding the present invention.

Referring now to FIG. 12, there is provided a flow diagram of an exemplary B-F type allocation method 1200 that is useful for understanding the present invention. It should be noted that the method 1200 can be performed by at least one processing element. As shown in FIG. 12, the method 1200 begins with step 1202 and continues with step 1203. Step 1203 involves generating a list of synchronous type data service tasks. The synchronous type data service tasks are arranged in an ordered sequence beginning with the task requiring the largest channel capacity to communicate data and ending with the task requiring the smallest channel capacity to communicate data. As should be understood, the method 1200 can be absent of step 1203. For example, a searching process can alternatively be performed. The searching process can involve searching for a synchronous data service task requiring a certain channel capacity to communicate data prior to allocating time chips of a time frame thereto. The searching process can begin by locating the synchronous type data service task requiring the largest channel capacity. After allocating time chips to the largest synchronous type data service task, the searching process is performed again for the next largest synchronous type data service task. This process can be repeated until time chips of time frames have been allocated to each synchronous type data service task of the plurality of synchronous type data service tasks.

In step 1204, a synchronous type data service task is selected from a plurality of synchronous type data service tasks. The synchronous type data service task can be selected using the list generated in the previous step 1203. After selecting the synchronous type data service task, the method 1200 continues with step 1206. Step 1206 involves determining the channel capacity required to communicate data in accordance with the selected synchronous type data service task. Thereafter, step 1208 is performed where a comparison is made. In particular, the channel capacity determined in the previous step 1206 is compared to the unallocated channel capacities of a plurality of time frames. Step 1208 is performed for determining if there is a sufficient unallocated channel capacity in at least one time frame capable of servicing the selected synchronous type data service task.

If there is a sufficient unallocated channel capacity in at least one time frame capable of servicing the selected synchronous data service task [1210:YES], then step 1212 is performed. In step 1212, a difference is calculated between the channel capacity determined in step 1206 and the channel capacity in each time frame having a sufficient unallocated channel capacity capable of servicing the selected synchronous type data service task. In step 1214, the selected synchronous type data service task is assigned to the time frame in which the smallest difference was calculated in step 1212. Thereafter, a decision step 1216 is performed. If there is still one unassigned synchronous type data service task in the list [1216:YES], then step 1218 is performed where a next synchronous type data service task is selected from the list. In step 1220, the method 1200 returns to step 1206. If there is not an unassigned synchronous type data service task in the list [1216:NO], then step 1224 is performed where the method 1200 ends.

If there is not a sufficient unallocated channel capacity in at least one time frame capable of servicing the selected synchronous data service task [1210:NO], then step 1222 is performed. In step 1222, the selected synchronous type data service task is scheduled for a next time frame. Subsequent to completing step 1222, the method 1200 continues with the decision step 1216. If there is still an unassigned synchronous type data service task in the list [1216:YES], then step 1218 is performed where a next synchronous type data service task is selected from the list. In step 1220, the method 1200 returns to step 1206. If there is not an unassigned synchronous type data service task in the list [1216:NO], then step 1224 is performed where the method 1200 ends.

Figure 13A:
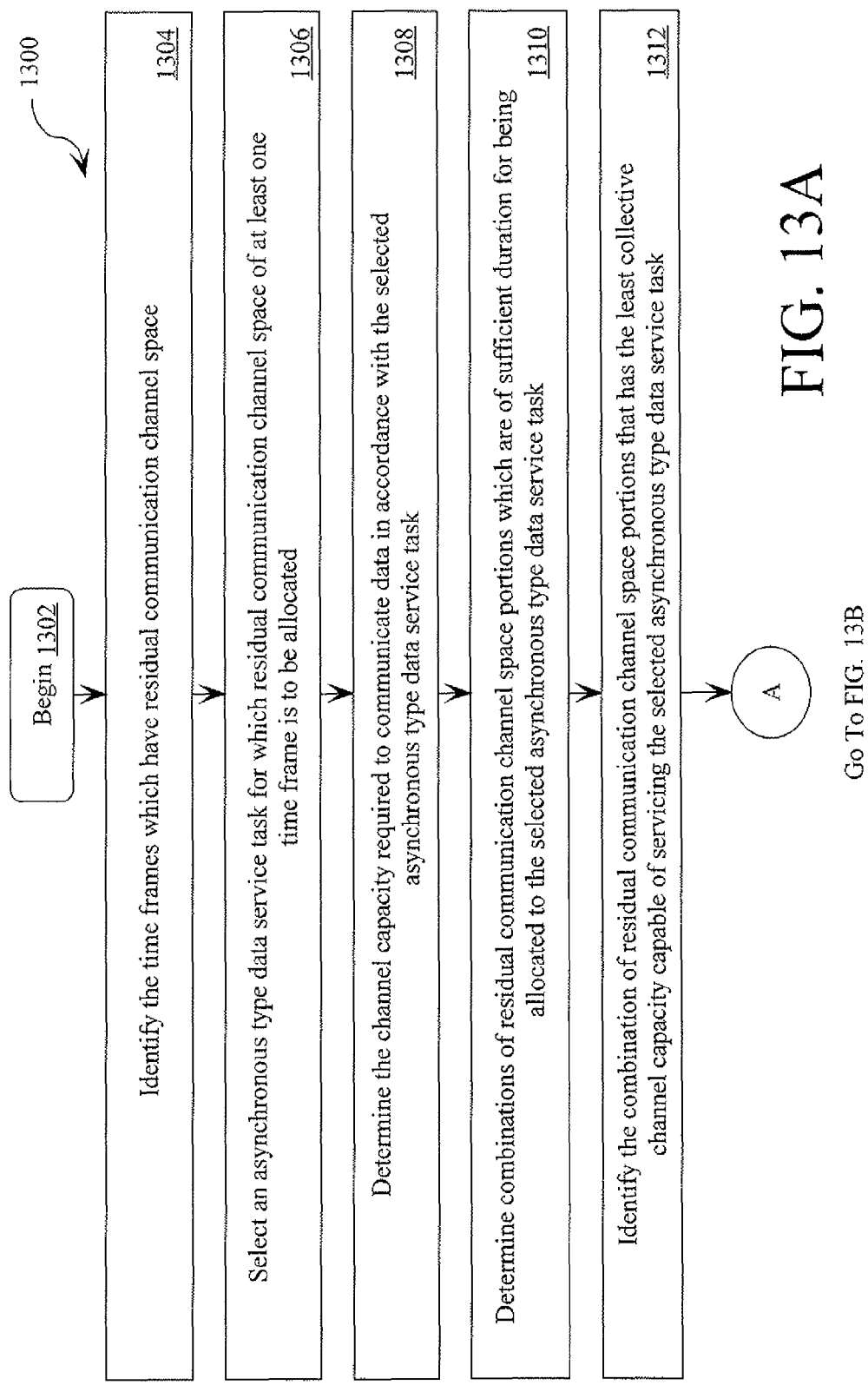
FIGS. 13A-13B collectively provide a flow diagram of a Residual Space Minimization type allocation method that is useful for understanding the present invention.
Figure 13B:
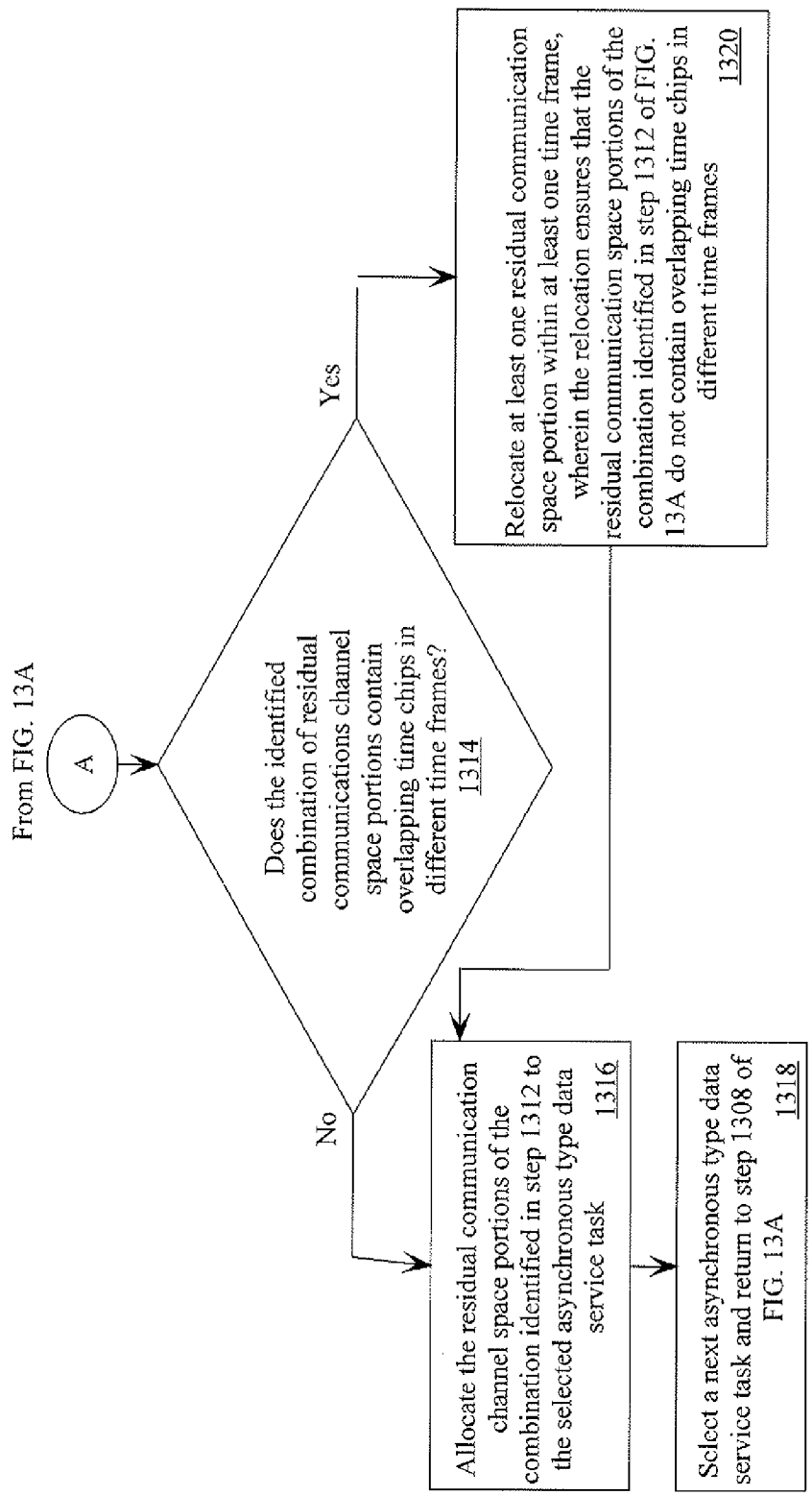

Referring now to FIGS. 13A-13B, there is provided a flow diagram of an RSM type allocation method 1300 that is useful for understanding the present invention. It should be noted that the method 1300 can be performed by at least one processing element. As shown in FIG. 13A, the method 1300 begins with step 1302 and continues with step 1304. In step 1304, time frames are identified which have residual channel communication space. After identifying the time frame which has residual channel communication space, step 1306 is performed. Step 1306 involves selecting an asynchronous task for which residual communication channel space of at least one time frame is to be allocated. Thereafter, step 1308 is performed. In step 1308, the channel capacity required to communicate data in accordance with the selected asynchronous data service task is determined. In step 1310, a determination is made regarding which combinations of residual communication channel space portions are of sufficient duration for being allocated to the selected asynchronous type data service task.

Upon completing step 1310, the method 1300 continues with step 1312. In step 1312, the combination of residual communication channel space portions that has the least collective channel capacity capable of servicing the selected asynchronous data service task is identified. Thereafter, the method 1300 continues with a decision step 1314 of FIG. 13B.

If the identified combination of residual communication channel space portions do not contain overlapping time chips in different frames [1314:NO], then step 1316 is performed. The phrase "overlapping time chips", as used herein, refers to time chips having the same number in at least two time frames. For example, overlapping time chips include time chips $302_{1-1}, \ldots, 302_{1-10}$ (described above in relation to FIG. 3) of time frame $202_{1-1}$ (described above in relation to FIGS. 2-3) and time chips $302_{2-1}, \ldots, 302_{2-10}$ (described above in relation to FIG. 3) of time frame $202_{2-1}$ (described above in relation to FIGS. 2-3). The invention is not limited in this regard. In step 1316, the residual communication channel space portions of the combination identified in previous step 1312 of FIG. 13A are allocated to the selected asynchronous type data service task. Thereafter, step 1318 is performed where a next asynchronous type data service task is selected. Step 1318 can also involve returning to step 1308 of FIG. 13A.

If the identified combination of residual communication channel space portions does contain overlapping time chips in different frames [1314:YES], then step 1320 is performed. In step 1320, at least one residual communication channel space portion is relocated within at least one time frame. This relocation step ensures that the residual communication channel space portions of the combination identified in the previous step 1312 of FIG. 13A do not include overlapping time chips in different time frames. Subsequent to completing step 1320, the method 1300 continues with step 1316.

In light of the forgoing description of the invention, it should be recognized that the present invention can be realized in hardware, software, or a combination of hardware and software. A method for forming the BFDMS arrangement according to the present invention can be realized in a centralized fashion in one processing system or in a distributed fashion where different elements are spread across several interconnected processing systems. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following: (a) conversion to another language, code or notation; (b) reproduction in a different material form. Additionally, the description above is intended by way of example only and is not intended to limit the present invention in any way, except as set forth in the following claims.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

I claim:

1. A method for allocating performance of a set of data service tasks of a defined duration or data volume among a plurality of time frames respectively defined in a plurality of separate communication channels, each of said separate communication channels comprising a different frequency band, where each of said time frames is of a predetermined duration and is subdivided into a predetermined number of time chips, comprising:
   first allocating, in a communication device, portions of said plurality of time frames to a plurality of synchronous type data service tasks which must be communicated in consecutive time chips of a single communication channel;
   second allocating, in said communication device, a plurality of residual channel space portions of said plurality of time frames remaining after said first allocating, to a plurality of asynchronous type data service tasks which do not require data to be communicated in consecutive time chips of a single communication channel;
   wherein said second allocating includes determining two or more combinations of said plurality of residual channel space portions which are of sufficient duration for being allocated to a first one of said asynchronous type data service tasks and allocating said first one of said asynchronous type data service tasks to said combination which has the least collective channel capacity capable of servicing said first one of said asynchronous type data service tasks.

2. The method according to claim 1, further comprising prior to said first allocating step, ordering said plurality of synchronous type data service tasks in accordance with said defined duration or said data volume of each said synchronous type data service task.

3. The method according to claim 1, further comprising performing said first allocating step in accordance with a first to fit type allocation method in which said synchronous data services tasks are assigned to said time frames without regard to said defined duration or said data volume, except when said defined duration or said data volume exceeds a remaining capacity in a time frame.

4. The method according to claim 1, further comprising performing said first allocation step in accordance with a best fit allocation method in which said synchronous data services tasks are assigned to said time frames in accordance with an ordering based on said data volume or said defined duration of each said synchronous type data service task.

5. The method according to claim 1, wherein said second allocating includes allocating a first one of said plurality of asynchronous type data service tasks to at least two non-consecutive residual channel space portions in at least two different communication channels.

6. The method according to claim 1, wherein at least one of said one or more combinations comprises residual channel space portions in at least two different communications channels of said plurality of separate communication channels.

7. A method for allocating performance of a set of data service tasks of a defined duration or data volume among a plurality of time frames respectively defined in a plurality of separate communication channels, each of said separate communication channels comprising a different frequency band, where each of said time frames is of a predetermined duration and is subdivided into a predetermined number of time chips, comprising:
   first allocating, in a communication device, portions of said plurality of time frames to a plurality of synchronous type data service tasks which must be communicated in consecutive time chips of a single communication channel;
   second allocating, in said communication device, a plurality of residual channel space portions of said plurality of time frames remaining after said first allocating, to a plurality of asynchronous type data service tasks which do not require data to be communicated in consecutive time chips of a single communication channel, said second allocating step including determining one or more combinations of said plurality of residual channel space portions which are of sufficient duration for being allocated to at least a first one of said asynchronous type data service tasks, and
   further comprising determining if said combination of said plurality of residual channel space portions contains overlapping time chips in different time frames.

8. The method according to claim 7, further comprising relocating at least one residual channel space portion within at least one of said time frames if said combination of said plurality of residual channel space portions contain overlapping time chips in different time frames.

9. A system for allocating performance of a set of data service tasks of a defined duration or data volume among a plurality of time frames respectively defined in a plurality of separate communication channels, each of said separate communication channels comprising a different frequency band, where each of said time frames is of a predetermined duration and is subdivided into a predetermined number of time chips, comprising:
- at least one processing element configured to (a) allocate portions of said plurality of time frames to a plurality of synchronous type data service tasks which must be communicated in consecutive time chips of a single communication channel, and (b) allocate a plurality of residual channel space portions of said plurality of time frames remaining after allocating portions of said plurality of time frames to said plurality of synchronous type data service tasks, to a plurality of asynchronous type data service tasks which do not require data to be communicated in consecutive time chips of a single communication channel;
- at least one transceiver device coupled to the at least one processing element and configured to transmit data associated with said synchronous type data service tasks and said asynchronous type data service tasks,
- wherein said allocating of said plurality of residual channel space portions comprises determining two or more combinations of said plurality of residual channel space portions which are of sufficient duration for being allocated to a first one of said asynchronous type data service tasks and allocating said first one of said asynchronous type data service tasks to said combination which has the least collective channel capacity capable of servicing said first one of said asynchronous type data service tasks.

10. The system according to claim 9, wherein said at least one processing element is further configured to order said plurality of synchronous type data service tasks in accordance with said defined duration or said data volume of each said synchronous type data service task, prior to allocating portions of said plurality of time frames to said plurality of synchronous type data service tasks.

11. The system according to claim 9, wherein said at least one processing element is further configured to allocate portions of said plurality of time frames to said plurality of synchronous type data service tasks in accordance with a first to fit type allocation method in which said synchronous data services tasks are assigned to said time frames without regard to said defined duration or said data volume, except when said defined duration or said data volume exceeds a remaining capacity in a time frame.

12. The system according to claim 9, wherein said at least one processing element is further configured to allocate portions of said plurality of time frames to said plurality of synchronous type data service tasks in accordance with a best fit allocation method in which said synchronous data services tasks are assigned to said time frames in accordance with an ordering based on said data volume or said defined duration of each said synchronous type data service task.

13. The system according to claim 9, wherein said processing element is further configured to allocate a first one of said plurality of asynchronous type data service tasks to at least two non-consecutive residual channel space portions in at least two different communication channels.

14. The system according to claim 9, wherein at least one of said one or more combinations comprises residual channel space portions in at least two different communications channels of said plurality of separate communication channels.

15. A system for allocating performance of a set of data service tasks of a defined duration or data volume among a plurality of time frames respectively defined in a plurality of separate communication channels, each of said separate communication channels comprising a different frequency band, where each of said time frames is of a predetermined duration and is subdivided into a predetermined number of time chips, comprising:
- at least one processing element configured to (a) allocate portions of said plurality of time frames to a plurality of synchronous type data service tasks which must be communicated in consecutive time chips of a single communication channel, and (b) allocate a plurality of residual channel space portions of said plurality of time frames remaining after allocating portions of said plurality of time frames to said plurality of synchronous type data service tasks, to a plurality of asynchronous type data service tasks which do not require data to be communicated in consecutive time chips of a single communication channel;
- at least one transceiver device coupled to the at least one processing element and configured to transmit data associated with said synchronous type data service tasks and said asynchronous type data service tasks,
- wherein said at least one processing element is further configured to determine one or more combinations of said plurality of residual channel space portions which are of sufficient duration for being allocated to at least a first one of said asynchronous type data service tasks and for determining if said combination of said plurality of residual channel space portions contains overlapping time chips in different time frames.

16. The system according to claim 15, wherein said at least one processing element is further configured to relocate at least one residual channel space portion within at least one of said time frames if said combination of said plurality of residual channel space portions contain overlapping time chips in different time frames.

* * * * *